United States Patent
Strand

(10) Patent No.: US 6,892,547 B2
(45) Date of Patent: May 17, 2005

(54) COOLING SET POINT CONTROL

(75) Inventor: Rolf L. Strand, Crystal, MN (US)

(73) Assignee: Honeywell International Inc., Morristown, NJ (US)

( * ) Notice: Subject to any disclaimer, the term of this patent is extended or adjusted under 35 U.S.C. 154(b) by 22 days.

(21) Appl. No.: 10/360,898

(22) Filed: Feb. 7, 2003

(65) Prior Publication Data

US 2004/0154321 A1 Aug. 12, 2004

(51) Int. Cl.[7] .............................................. F25B 49/02
(52) U.S. Cl. .................... 62/176.6; 236/44 C
(58) Field of Search .......................... 62/176.1, 176.6; 236/44 R, 44 A, 44 C, 91 C; 165/223

(56) References Cited

U.S. PATENT DOCUMENTS

| | | | |
|---|---|---|---|
| 4,735,054 A | 4/1988 | Beckey | 62/93 |
| 4,889,280 A * | 12/1989 | Grald et al. | 236/44 C |
| 4,947,928 A | 8/1990 | Parker et al. | 236/44.3 |
| 5,062,276 A | 11/1991 | Dudley | 62/176.6 |
| 5,346,129 A * | 9/1994 | Shah et al. | 236/44 C |
| 6,401,468 B1 | 6/2002 | Hoyle et al. | 62/175 |
| 6,557,771 B2 * | 5/2003 | Shah | |

* cited by examiner

Primary Examiner—Harry B. Tanner

(57) ABSTRACT

Methods and apparatus for controlling the cooling set point value of a climate control system are provided. In one illustrative embodiment, a humidity error is determined as a function of the actual humidity in the inside space and a humidity set point value. The cooling set point value is then adjusted by a cooling offset that is a function of the humidity error. Under humid conditions, and when insufficient dehumidification occurs during a normal cooling cycle, lowering the cooling set point may provide further dehumidification, which may improve comfort in the inside space. Under less humid conditions, and when the humidity level in the inside space is already below the humidity set point value, increasing the cooling set point value may lower the energy usage of the climate control system while still providing comfort.

26 Claims, 5 Drawing Sheets

COOLING SET POINT CONTROL

BACKGROUND

This invention is directed generally to control of indoor climate modifying apparatus such as an air conditioning unit or a furnace for maintaining comfort for the occupants of enclosures. The more important application is in controlling operation of air conditioners, and the discussion and disclosure following will be based primarily on the air conditioning case. The invention will typically be implemented in an electronic thermostat which uses a microcontroller in conjunction with a temperature sensor and a humidity sensor for controlling opening and closing of a solid state switch which controls the flow of operating current to the air conditioning control module.

Thermostats typically in use now which direct operation of air conditioners use dry-bulb temperature as the controlled variable. The term "dry-bulb temperature", as used herein, means the actual temperature of the air as measured by a typical thermometer. The terms "temperature" and "air temperature" hereafter will refer to dry-bulb temperature unless the context clearly directs otherwise. It is easy to measure air temperature and this measurement is already available in most thermostats. A typical thermostat in air conditioning mode causes the air conditioning to begin operating when temperature rises above a cooling set point value. The air conditioner responds by injecting cold air into the enclosure until the temperature within the enclosure has fallen to a point below the cooling set point value. The typical thermostat uses an anticipation element so as to turn off the air conditioning before the actual cooling set point is reached. For many situations, this type of control results in air which is comfortable for the enclosure's occupants.

It is well known that an air conditioner removes humidity from the air as well as cools it. The mechanism by which humidity is removed involves passing air from the enclosure or from the outside through the air conditioner, reducing the temperature of this air to substantially less than the comfort range of, for example, 70°–74° F. In order to remove humidity from the air, the temperature of at least some of the air must be lowered to less than the current dew point temperature, the temperature at which water condenses from the air. Some of the water in the conditioned air condenses on the cooling coils of the air conditioner in this process and drips off the coils to a pan below, from which it drains. Because air will not release any of its humidity until it has reached 100% relative humidity, i.e., its dew point temperature, it is necessary for at least the air adjacent the cooled surfaces of the heat exchanger to reach this temperature. All of the air in the air stream that passes through the air conditioner, however, may not reach 100% relative humidity because not all of the air is cooled to its dew point. The relatively cold and dry conditioned air (relatively dry even though it has nearly 100% relative humidity) is mixed with the uncomfortably warm and humid air within the enclosure to achieve a more acceptable 40–60% relative humidity at a comfortable temperature of 70°–75° F. as well controlled by the thermostat.

Normally this procedure results in air within the enclosure whose humidity is within the comfort range. However, there are situations that can result in air having humidity which is still too high when the temperature requirement has been met. To achieve air at comfortable levels of both temperature and humidity, an air conditioner is typically sized for the expected load which the enclosure will present so that when the set point temperature is reached, the humidity is acceptable. But in cases of unusually high humidity or where the air conditioner capacity relative to the current environmental conditions does not result in sufficient dehumidification when the set point temperature is reached, it is possible for the air in the enclosure to have excessive humidity.

SUMMARY OF THE INVENTION

The present invention provides methods and apparatus for controlling the cooling set point value of a climate control system for an inside space. In one illustrative embodiment, a humidity error is determined as a function of the actual humidity in the inside space and a humidity set point value. The cooling set point value is then adjusted by a cooling offset that is a function of the humidity error. Under humid conditions, and when insufficient dehumidification occurs during a normal cooling cycle, lowering the cooling set point may provide further dehumidification, which may improve comfort in the inside space. Under less humid conditions, and when the humidity level in the inside space is already below the humidity set point value, increasing the cooling set point value may lower the energy usage of the climate control system while still providing comfort.

In some embodiments, a sensor is provided for sensing the actual humidity of the inside space. The humidity set point value may then be, for example, subtracted from the actual humidity value to produce the humidity error. In some cases, a predetermined humidity offset value may be subtracted from the humidity error to provide an updated humidity error. The use of a predetermined humidity offset value may provide an operating region around the humidity set point value where the cooling set point is not adjusted. The actual humidity and the humidity set point value are preferably relative humidity values, but it is recognized that any suitable measure of water content may be used.

The humidity error is preferably translated into a cooling offset, which is used to adjust the cooling set point value of the climate control system. In some embodiments, the cooling offset is related to the humidity error by a linear function. For example, the cooling offset may be set equal to the humidity error multiplied by a scale factor. In other embodiments, the cooling offset may be related to the humidity error by a non-linear function, such as an exponential function or the like. Once calculated, the cooling set point may be adjusted by the cooling offset, such as by subtracting the cooling offset from the cooling set point value.

Under humid conditions, and when insufficient dehumidification occurs during a normal cooling cycle, the cooling set point may be decreased (i.e. decreased to a lower set point temperature) by the cooling offset value to provide further dehumidification to the air in the inside space. Under less humid conditions, and when the humidity level in the inside space is already below the humidity set point value, the cooling set point may be increased (i.e. increased to a higher set point temperature) by the cooling offset value to lower energy usage of the climate control system.

In some embodiments, the cooling offset is limited to a predetermined cooling offset range. The predetermined cooling offset range may be bounded on an upper side by a cooling offset maximum or bounded on a lower side by a cooling offset minimum, or both. This may limit the amount that the cooling set point value is changed in response to varying humidity conditions.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE INVENTION

The following detailed description should be read with reference to the drawings, in which like elements in different drawings are numbered in like fashion. The drawings, which are not necessarily to scale, depict selected embodiments and are not intended to limit the scope of the invention. Those skilled in the art will recognize that many of the examples provided may have suitable alternatives that could be utilized without departing from the spirit of the present invention.

Figure 1:
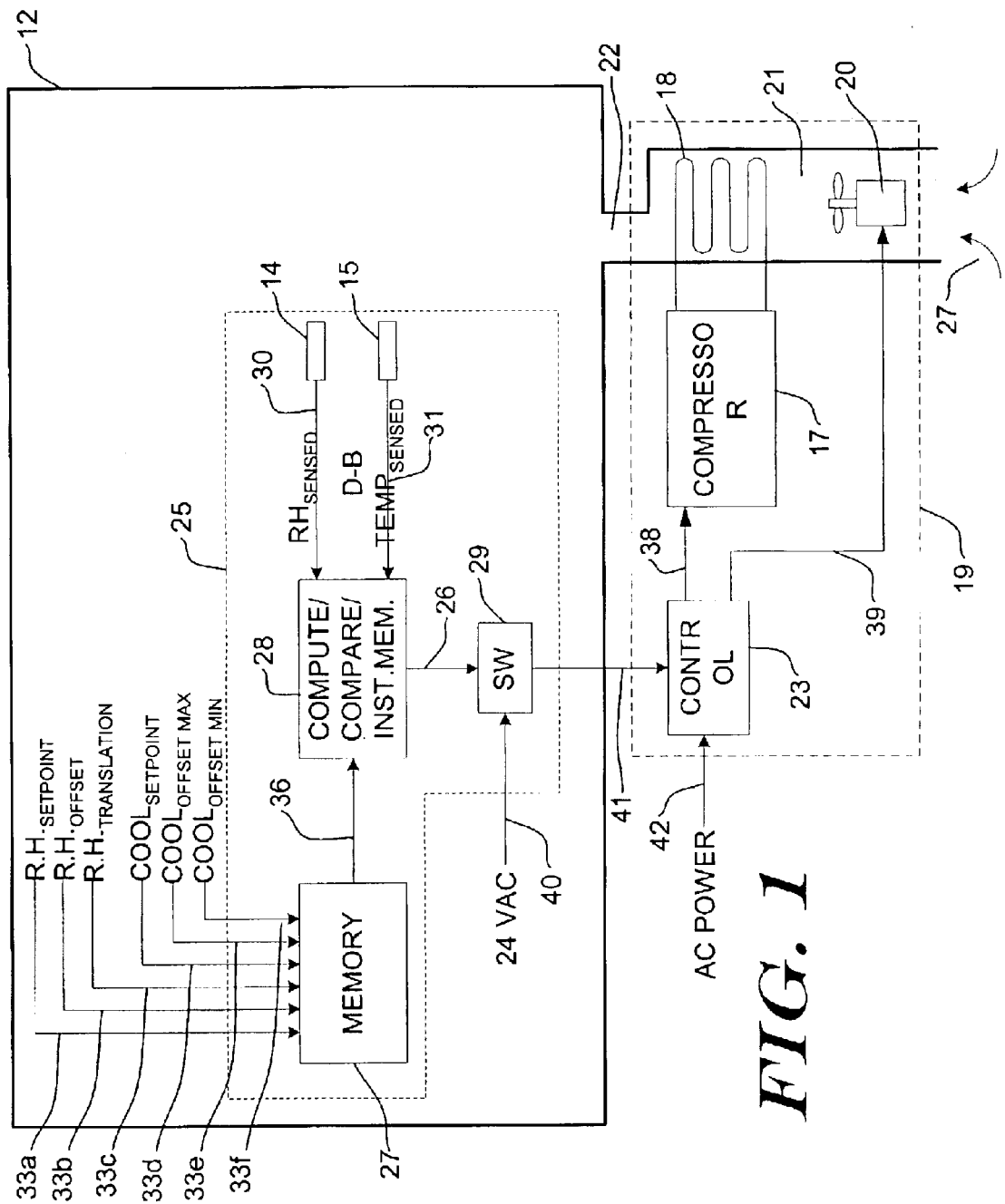
FIG. 1 is a block diagram of an air conditioning installation using an illustrative embodiment of the present invention.

FIG. 1 is a block diagram of an air conditioning installation using an illustrative embodiment of the present invention. In FIG. 1, a climate control system is shown for controlling the air temperature of an inside space 12. In the illustrative embodiment, the inside space 12 receives cooled and dehumidified air from a conventional air conditioning unit 19 which operates on externally supplied AC power provided on conductors 42. A control element 23 switches power to a compressor 17 and a blower 20 on conductors 38 and 39 respectively, thereby providing sequencing as needed for their operation. Compressor 17 provides liquid coolant to expander coil 18 which is located in a heat exchanger plenum 21 along with the blower 20. The air conditioning unit 19 operates while a demand signal is present on path 26. The demand signal on path 26 closes switch 29, which allows control current supplied by a 24 VAC source on path 40 to flow to the air conditioning unit controller 23 on path 41. While air conditioning unit 19 is operating, fan 20 forces air across coil 18 to cool and dehumidify the air. This conditioned air flows into inside space 12 through duct 22 to reduce both the temperature and humidity of the air within inside space 12. The intake air 27 to the air conditioning unit 19 may be taken from the inside space 12, from outside the inside space, or both as desired. The demand signal on path 26 is provided by a controller 25 whose functions may occur within electronic circuitry. In some cases, controller 25 is attached to a wall of inside space 12 in the manner done for conventional thermostats.

The illustrative controller 25 includes a memory unit 27 which can store digital data and a processor unit 28 which can perform computation and comparison operations on data supplied to it from both memory 27 and from external sources, and which also includes an instruction memory element. In some embodiments, a conventional microcontroller may be used to function as memory 27 and processor 28. Controller 25 further may include a humidity sensor 14 located within inside space 12 and which provides a humidity signal on path 30. The humidity signal on path 30 may encode the relative humidity of the air within the inside space 12, but alternatively may encode the dew point temperature, the wet-bulb temperature, or any other suitable measure of water content in the air of the inside space 23. A temperature sensor 15 may also be provided in the inside space 12 to provide a temperature signal on path 31 to processor 28. The temperature signal on path 31 may encode a dry-bulb temperature value or any other suitable measure of temperature of the air in the inside space 12.

In the illustrative embodiment of FIG. 1, paths 33a–33f carry various signals to memory 27. The signals on paths 33a–33f encode various set point values and other parameters that may be used by the present invention. It is recognized, however, that not all of the signals on paths 33a–33f are required for every embodiment of the present invention. Typically the signals on paths 33a–33f may have factory default settings, and/or may be provided or altered by a person responsible for controlling the climate of inside space 12. For example, the set point values on paths 33a and 33d may be selected by a user by simply shifting control levers or dials carried on the exterior of controller 25. These values may also be selected by a keypad which provides digital values. The other values on paths 33b, 33c, 33e and 33f may be provided or altered in a similar manner, if desired.

In the illustrative embodiment, path 33a carries a humidity signal encoding a humidity set point value representative of the desired relative humidity within the inside space 12. This humidity set point value may be the actual desired relative humidity, or the desired dew point temperature, or even the desired wet-bulb temperature. Path 33d carries a signal encoding a cooling (dry-bulb) temperature set point value, which may be the desired cooling dry bulb temperature of the inside space. Path 33b carries a relative humidity offset value, path 33c carries a relative humidity translation value or function, path 33e carries a cool offset maximum value, and path 33f carries a cool offset minimum value, the significance of which will become apparent below. Memory 27 records these various values, and encodes them in one or more signals carried to processor 28 on a path 36. If memory 27 and processor 28 are formed of a conventional microcontroller, the procedures by which these values are provided to processor 28 when needed are included in further circuitry not shown which provides a conventional control function for the overall operation of such a microcontroller.

Figure 2:
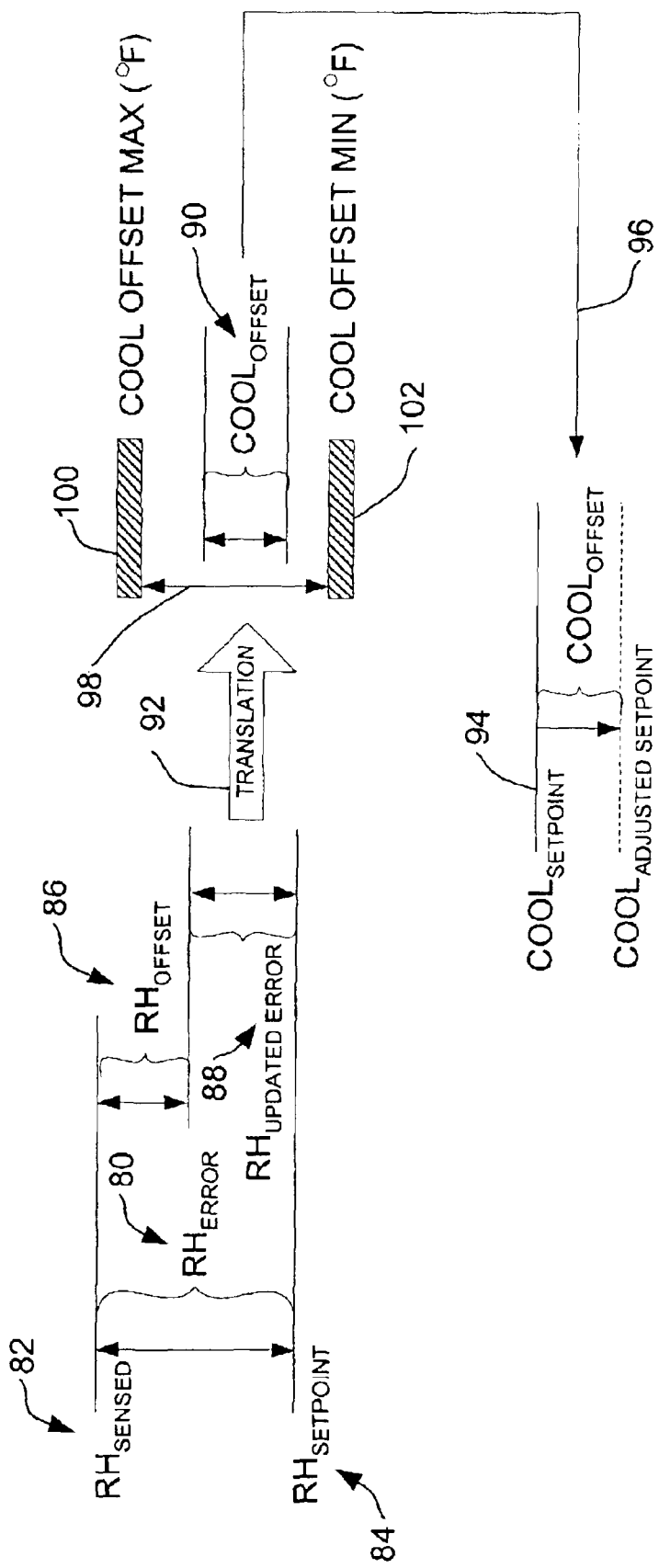
FIG. 2 is a diagram showing an illustrative calculation for an adjusted cool set point in accordance with the present invention.

FIG. 2 is a diagram showing an illustrative calculation for an adjusted cool set point in accordance with the present invention. As noted above, the present invention provides methods and apparatus for controlling the cooling set point value of a climate control system for an inside space. In the illustrative embodiment shown in FIG. 2, a humidity error ($RH_{ERROR}$) 80 is first determined by calculating the difference between the actual humidity ($RH_{SENSED}$) 82 of the inside space 12 and the humidity set point value ($RH_{SETPOINT}$) 84. In FIG. 2, the actual humidity ($RH_{SENSED}$) 82 of the inside space 12 is higher than the humidity set point value ($RH_{SETPOINT}$) 84. The actual humidity value ($RH_{SENSED}$) 82 may be, for example, the encoded relative humidity signal provided by the relative humidity sensor 14 of FIG. 1, and the humidity set point value ($RH_{SETPOINT}$) 84 may be the relative humidity set point value provided on path 33a and stored in memory 27 of FIG. 1. In some cases, a humidity offset value ($RH_{OFFSET}$) 86 may be subtracted from the humidity error ($RH_{ERROR}$) 80 to provide an updated humidity error ($RH_{UPDATED\ ERROR}$) 88. The use of a predetermined humidity offset value ($RH_{OFFSET}$) 86 may help provide an operating region around the humidity set point value ($RH_{SETPOINT}$) 84 where the cooling set point is not adjusted.

In the illustrative embodiment, the humidity error ($RH_{ERROR}$) 80 or the updated humidity error ($RH_{UPDATED\ ERROR}$) 88 is translated into a cooling offset value ($COOL_{OFFSET}$) 90 via a translation function 92. The cooling offset value ($COOL_{OFFSET}$) 90 is used to adjust the cooling set point value ($COOL_{SETPOINT}$) 94 of the climate control system, as indicated by line 96. The cooling set point value ($COOL_{SETPOINT}$) 94 may be, for example, the cooling offset set point value provided on path 33d and stored in memory 27 of FIG. 1.

In some embodiments, the cooling offset value ($COOL_{OFFSET}$) 90 is related to the humidity error ($RH_{ERROR}$) 80 or the updated humidity error ($RH_{UPDATED\ ERROR}$) 88 by a linear function. For example, the cooling offset value ($COOL_{OFFSET}$) 90 may be equal to the updated humidity error ($RH_{UPDATED\ ERROR}$) 88 multiplied by a scale factor. The scale factor may be, for example, a value ($RH_{TRANSLATION}$) encoded on path 33c and stored in memory 27 of FIG. 1. In other embodiments, the cooling offset value ($COOL_{OFFSET}$) 90 may be related to the updated humidity error ($RH_{UPDATED\ ERROR}$) 88 by a non-linear function, such as an exponential function or the like. Several illustrative translation functions are shown and described with respect to FIG. 4 below.

In some embodiments, the ($COOL_{OFFSET}$) 90 is limited to a predetermined cooling offset range 98. The cooling offset range 98 may be bounded on an upper side by a cooling offset maximum 100 or bounded on a lower side by a cooling offset minimum 102, or both. This may limit the amount that the cooling set point value can be altered in response to varying humidity conditions.

Once calculated, the cooling set point value ($COOL_{SETPOINT}$) 94 may be adjusted by the cooling offset value ($COOL_{OFFSET}$) 90, such as by subtracting the cooling offset value ($COOL_{OFFSET}$) 90 from the cooling set point value ($COOL_{SETPOINT}$) 94 as shown in FIG. 2.

Under humid conditions and when insufficient dehumidification occurs during a normal cooling cycle, the cooling set point value ($COOL_{SETPOINT}$) 94 may thus be decreased (i.e. lowered to cooler set point temperature) by an amount that corresponds to the cooling offset value ($COOL_{OFFSET}$) 90. This may provide further dehumidification to the air in the inside space 12 for increased comfort.

Figure 3:
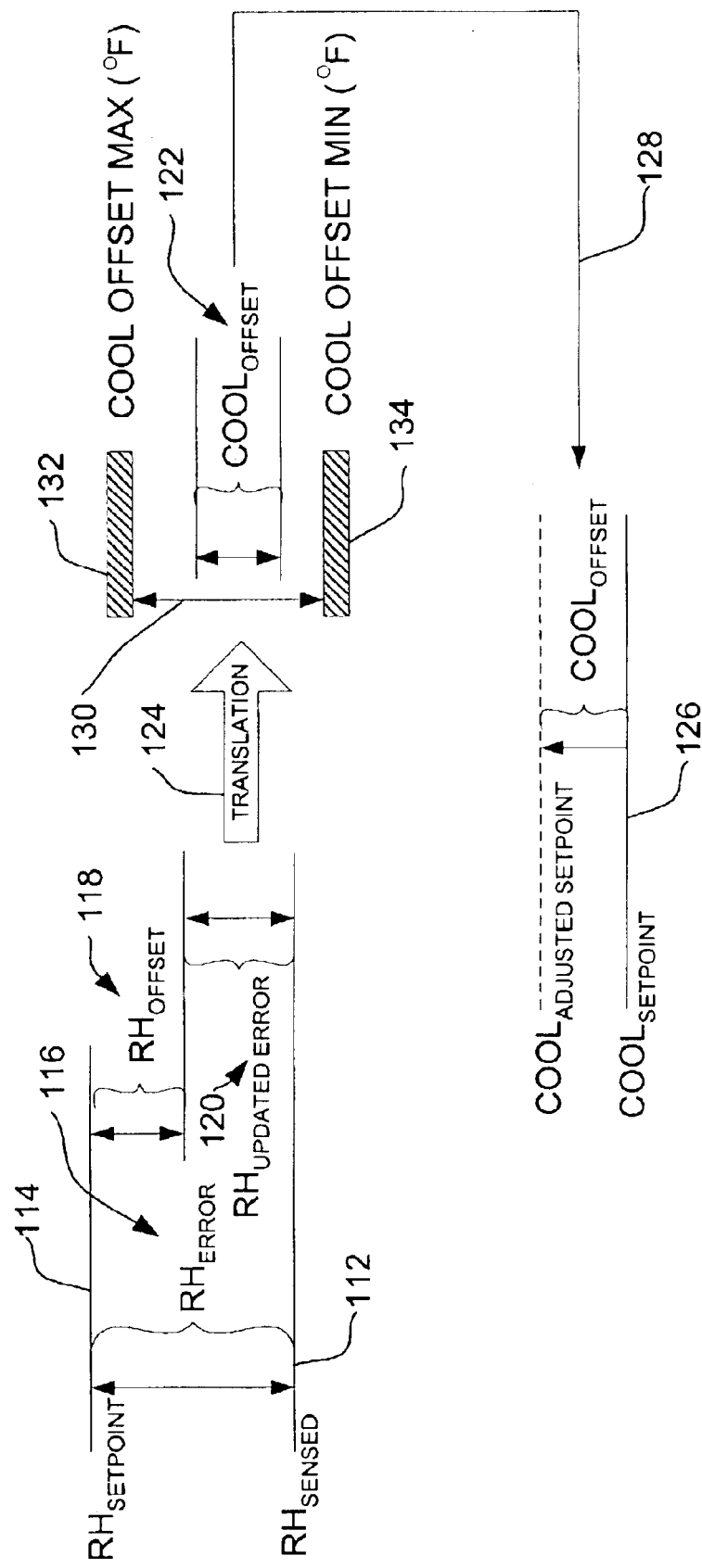
FIG. 3 is a diagram showing another illustrative calculation for an adjusted cool set point in accordance with the present invention.

FIG. 3 is a diagram showing another illustrative calculation for an adjusted cool set point in accordance with the present invention. In this embodiment, the actual humidity ($RH_{SENSED}$) 112 of the inside space 12 is lower than the humidity set point value ($RH_{SETPOINT}$) 114. A humidity error ($RH_{ERROR}$) 116 is determined by calculating the difference between the actual humidity ($RH_{SENSED}$) 112 of the inside space 12 and the humidity set point value ($RH_{SETPOINT}$) 114. The actual humidity ($RH_{SENSED}$) 112 may be, for example, the encoded relative humidity signal provided by the relative humidity sensor 14 of FIG. 1, and the humidity set point value ($RH_{SETPOINT}$) 114 may be the relative humidity set point value provided on path 33a and stored in memory 27 of FIG. 1. In some cases, a humidity offset value ($RH_{OFFSET}$) 118 may be subtracted from the humidity error ($RH_{ERROR}$) 116 to provide an updated humidity error ($RH_{UPDATED\ ERROR}$) 120. The use of a predetermined humidity offset value ($RH_{OFFSET}$) 118 may help provide an operating region around the humidity set point value ($RH_{SETPOINT}$) 114 where the cooling set point is not adjusted.

In the illustrative embodiment, the humidity error ($RH_{ERROR}$) 116 or the updated humidity error ($RH_{UPDATED\ ERROR}$) 120 is translated into a cooling offset value ($COOL_{OFFSET}$) 122 via a translation function 124. The cooling offset value ($COOL_{OFFSET}$) 122 is used to adjust the cooling set point value ($COOL_{SETPOINT}$) 126 of the climate control system, as indicated by line 128. The cooling set point value ($COOL_{SETPOINT}$) 126 that is adjusted may be, for example, the cooling offset set point value provided on path 33d and stored in memory 27 of FIG. 1.

In some embodiments, the cooling offset value ($COOL_{OFFSET}$) 122 is related to the humidity error ($RH_{ERROR}$) 116 or the updated humidity error ($RH_{UPDATED\ ERROR}$) 120 by a linear function. For example, the cooling offset value ($COOL_{OFFSET}$) 122 may be equal to the updated humidity error ($RH_{UPDATED\ ERROR}$) 120 multiplied by a scale factor. In other embodiments, the cooling offset value ($COOL_{OFFSET}$) 122 may be related to the updated humidity error ($RH_{UPDATED\ ERROR}$) 120 by a non-linear function, such as an exponential function or the like. Several illustrative translation functions are shown and described with respect to FIG. 4 below.

In some embodiments, the ($COOL_{OFFSET}$) 122 is limited to a predetermined cooling offset range 130. The cooling offset range 130 may be bounded on an upper side by a cooling offset maximum 132 or bounded on a lower side by a cooling offset minimum 134, or both. This may limit the amount that the cooling set point value can be altered in response to varying humidity conditions.

Once calculated, the cooling set point value ($COOL_{SETPOINT}$) 126 may be adjusted by the cooling offset value ($COOL_{OFFSET}$) 122, such as by subtracting a negative cooling offset value ($COOL_{OFFSET}$) 122 from the cooling set point value ($COOL_{SETPOINT}$) 126 as shown in FIG. 3. Under less humid conditions and when the actual humidity ($RH_{SENSED}$) 112 in the inside space 12 is already below the humidity set point value ($RH_{SETPOINT}$) 114, the cooling set point value ($COOL_{SETPOINT}$) 126 may thus be increased (i.e. elevated to a warmer set point temperature) by an amount corresponding to the cooling offset value ($COOL_{OFFSET}$) 122, resulting in potential lower energy usage.

Figure 4:
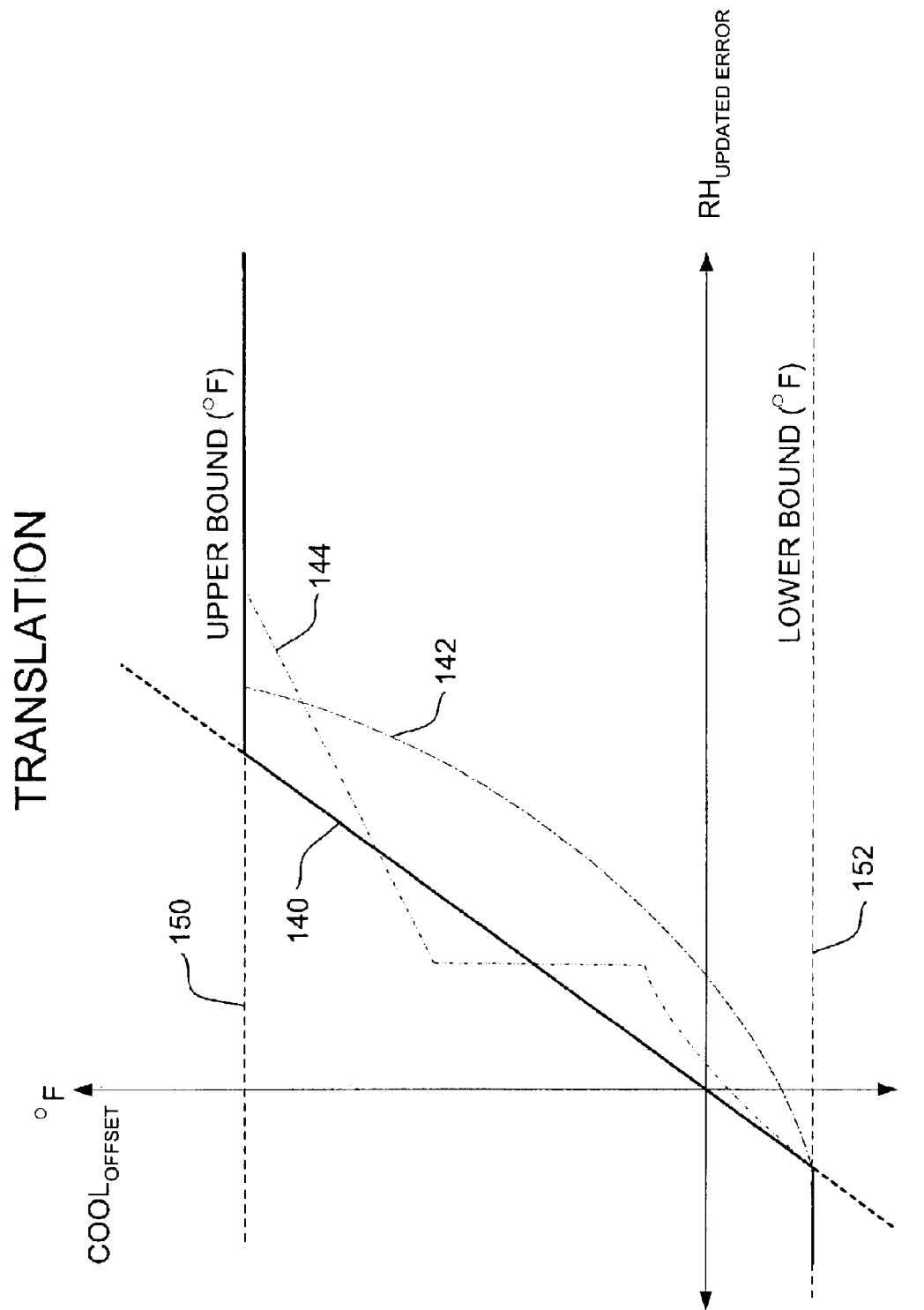
FIG. 4 is a graph showing a number of illustrative translation functions for translating a humidity error to a cool offset in accordance with the present invention.

FIG. 4 is a graph showing a number of illustrative translation functions for translating a humidity error to a cool offset in accordance with the present invention. As noted above, the cooling offset value ($COOL_{OFFSET}$) may be related to a humidity error ($RH_{ERROR}$) or an updated humidity error ($RH_{UPDATED\ ERROR}$) by a linear or non-linear function, as desired. FIG. 4 shows three illustrative translation functions including translation functions 140, 142 and 144. Translation function 140 is a linear translation function that linearly translates an updated humidity error ($RH_{UPDATED\ ERROR}$) to a cooling offset value ($COOL_{OFFSET}$). One illustrative linear translation function may be a function that simply multiplies the updated humidity error ($RH_{UPDATED\ ERROR}$) by a scale factor to produce the cooling offset value ($COOL_{OFFSET}$). More complex linear translation functions are also contemplated, depending on the application. Translation function 142 is a non-linear translation function that non-linearly translates an updated humidity error ($RH_{UPDATED\ ERROR}$) to a cooling offset value ($COOL_{OFFSET}$). An illustrative non-linear translation function may be, for example, an exponential function. Finally, translation function 144 is a non-linear translation function that includes linear regions and non-linear regions. It is contemplated that any suitable transformation function may be used, as desired.

Although not required, the cooling offset value ($COOL_{OFFSET}$) may be limited to a predetermined cooling offset range. In FIG. 4, the cooling offset range is bounded on an upper side by a cooling offset maximum 150 and on a lower side by a cooling offset minimum 152. This may limit the range that the cooling set point value ($COOL_{SETPOINT}$) can be altered in response to varying humidity conditions.

Figure 5:
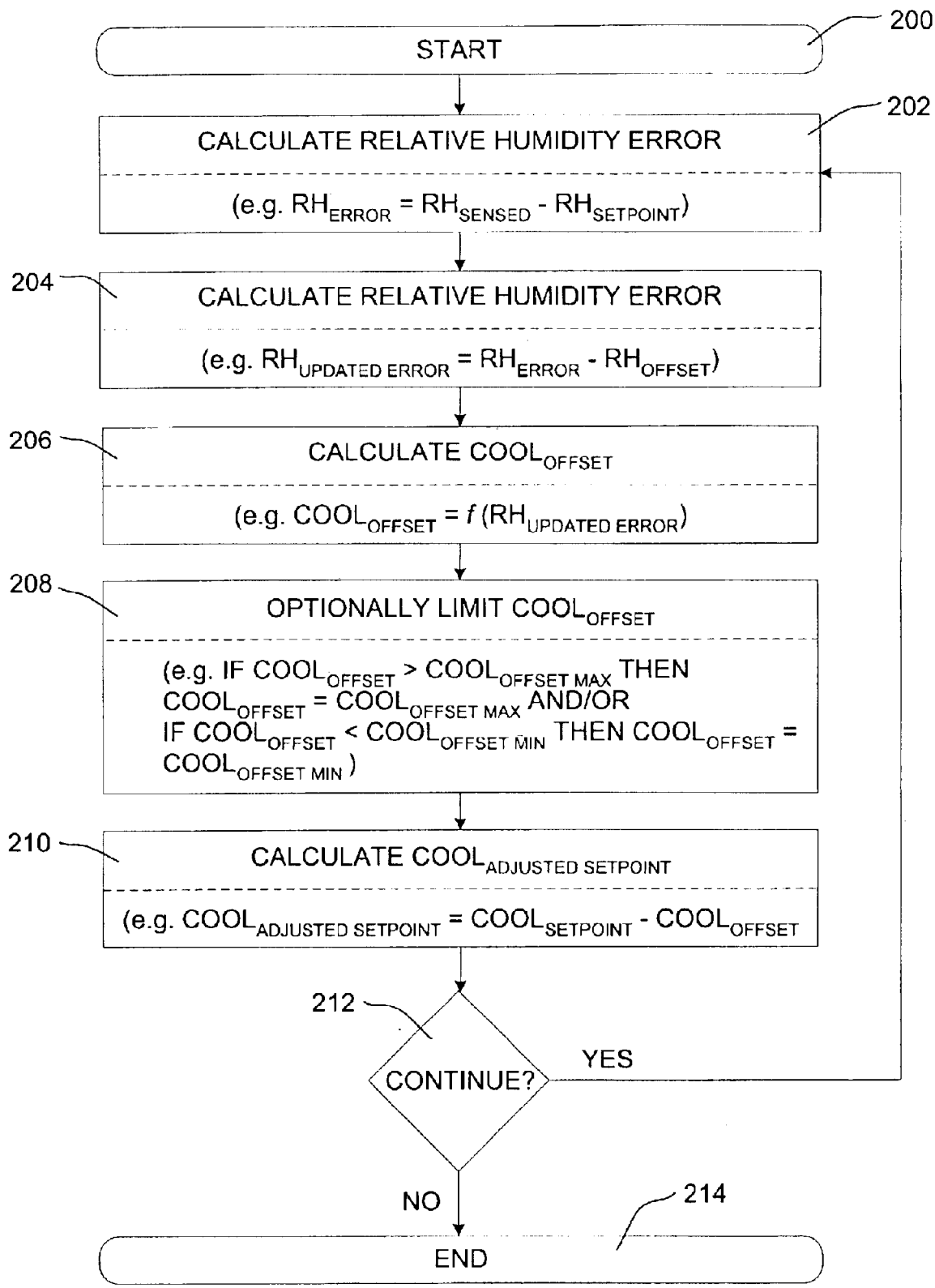
FIG. 5 is a flow chart showing an illustrative embodiment of the present invention.

FIG. 5 is a flow chart showing an illustrative embodiment of the present invention. Referring to FIG. 5, the algorithm is entered at step 200, wherein control is passed to step 202. Step 202 calculates a relative humidity error. In the example shown, the relative humidity error ($RH_{ERROR}$) is set equal to the actual relative humidity ($RH_{SENSED}$) minus the relative humidity set point value ($RH_{SETPOINT}$). Control is then passed to step 204. Step 204 calculates an updated relative humidity error ($RH_{UPDATED\ ERROR}$). In the example shown the updated relative humidity error ($RH_{UPDATED\ ERROR}$) is set to the relative humidity error ($RH_{ERROR}$) minus a relative humidity offset value ($RH_{OFFSET}$). Control is then passed to step 206. Step 206 calculates a cool offset value. In the example shown, the cool offset value ($COOL_{OFFSET}$) is related to the updated relative humidity error ($RH_{UPDATED\ ERROR}$) by a function $f(x)$. For example, the cooling offset value ($COOL_{OFFSET}$) may be set equal to the updated humidity error ($RH_{UPDATED\ ERROR}$) multiplied by a scale factor, wherein the scale factor is encoded the $RH_{TRANSLATION}$ value provided on path 33c and stored in memory 27 of FIG. 1. In other embodiments, the cooling offset value ($COOL_{OFFSET}$) may be related to the updated humidity error ($RH_{UPDATED\ ERROR}$) by any linear or non-linear function, as desired. As noted above, several illustrative translation functions are shown and described with respect to FIG. 4 above.

Control is then passes to step 208. Step 208 optionally limits the cooling offset value ($COOL_{OFFSET}$) to a predetermined cooling offset range 130. In the example shown, if the cooling offset value ($COOL_{OFFSET}$) is greater than a cooling offset maximum ($COOL_{OFFSET\ MAX}$), then the cooling offset value ($COOL_{OFFSET}$) is set equal to the cooling offset maximum ($COOL_{OFFSET\ MAX}$), and if the cooling offset value ($COOL_{OFFSET}$) is less than a cooling offset minimum ($COOL_{OFFSET\ MIN}$), then the cooling offset value ($COOL_{OFFSET}$) is set equal to the cooling offset minimum ($COOL_{OFFSET\ MIN}$). Control is then passed to step 210. Step 210 calculates an adjusted cooling set point for the climate control system. In the example shown, the adjusted cooling set point ($COOL_{ADJUSTED\ SETPOINT}$) is set equal to the cooling set point ($COOL_{SETPOINT}$) minus the cooling offset value ($COOL_{OFFSET}$). However, any suitable function may be used.

Control is then passed to step 212. Step 212 determines if the algorithm should be continued. If the algorithm should be continued, control is passed back to step 202. If, however, the algorithm should not be continued, control is passed to step 214, wherein the algorithm is exited.

In one illustrative example, the relative humidity offset value ($RH_{OFFSET}$) may be 1% relative humidity, the $RH_{TRANSLATION}$ scale factor may be 0.25 degrees F. per percent relatively humidity, the cooling offset maximum ($COOL_{OFFSET\ MAX}$) may be three degrees F., and the cooling offset minimum ($COOL_{OFFSET\ MIN}$) may be zero degrees F. These settings yield a control strategy where the cooling set point starts to be lowered when the actual relative humidity ($RH_{SENSED}$) is 1% above the relative humidity set point value ($RH_{SETPOINT}$), and is limited to three degrees when the actual relative humidity ($RH_{SENSED}$) in the inside space is 13% above the relative humidity set point value ($RH_{SETPOINT}$). This control strategy may be particularly suited for providing further dehumidification and comfort when insufficient dehumidification occurs during a normal cooling cycle.

In another illustrative example, the relative humidity offset value ($RH_{OFFSET}$) may be −1% relative humidity, the $RH_{TRANSLATION}$ scale factor may be 0.25 degrees F. per percent relatively humidity, the cooling offset maximum ($COOL_{OFFSET\ MAX}$) may be zero degrees F., and the cooling offset minimum ($COOL_{OFFSET\ MIN}$) may be minus three degrees F. These settings yield a control strategy where the cooling set point starts to be raised when the actual relative humidity ($RH_{SENSED}$) is 1% below the relative humidity set point value ($RH_{SETPOINT}$), and is limited to three degrees when the actual relative humidity ($RH_{SENSED}$) of the inside space is 13% below the relative humidity set point value ($RH_{SETPOINT}$). This control strategy may be particularly suited for saving energy while maintaining comfort when the humidity level in the inside space is already below the humidity set point value. The above examples may be combined if desired to yield a cooling set point value that varies from −3 degrees F. to +3 degrees F. about the cooling set point value depending on the actual relative humidity ($RH_{SENSED}$) in the inside space.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for adjusting the cooling set point of a climate control system for an inside space, the climate control system having a cooling set point and a humidity set point, the method comprising the steps of:

determining a humidity error as a function of the actual humidity of the inside space and the humidity set point, wherein the function includes adding a humidity offset value; and adjusting the cooling set point by a cooling offset, wherein the cooling offset is a function of the humidity error.

2. A method according to claim 1 further comprising the step of sensing the actual humidity of the inside space.

3. A method according to claim 1 wherein the actual humidity and/or the humidity set point are relative humidity values.

4. A method according to claim 1 wherein the humidity error is determined by subtracting the humidity set point from the actual humidity of the inside space, and adding a humidity offset value.

5. A method according to claim 1 wherein the cooling offset is related to the humidity error by a linear function.

6. A method according to claim 5 wherein the cooling offset is equal to the humidity error multiplied by a scale factor.

7. A method according to claim 1 wherein the cooling offset is related to the humidity error by a non-linear function.

8. A method according to claim 1 further comprises the step of limiting the cooling offset to a predetermined cooling offset range.

9. A method according to claim 8 wherein the predetermined cooling offset range is at least partially defined by a cooling offset maximum.

10. A method according to claim 8 wherein the predetermined cooling offset range is at least partially defined by a cooling offset minimum.

11. A method according to claim 8 wherein the predetermined cooling offset range is defined by a cooling offset maximum and a cooling offset minimum.

12. A method according to claim 1 wherein the adjusting step includes subtracting the cooling offset from the cooling set point.

13. A method according to claim 1 wherein the cooling set point corresponds to a cooling set point set by a user of the climate control system, and the cooling set point is adjusted downward.

14. A method according to claim 1 wherein the cooling set point corresponds to a cooling set point set by a user of the climate control system, and the cooling set point is adjusted upward.

15. A method for adjusting the cooling set point of a climate control system for an inside space, the climate control system having a cooling set point and a humidity set point, wherein the cooling set point is set by a user of the climate control system, the method comprising the steps of:

determining if the actual humidity of the inside space is below the humidity set point by at least a predetermined amount; and adjusting the cooling set point in an upward direction if the actual humidity of the inside space is determined to be below the humidity set point by at least the predetermined amount.

16. A method according to claim 15 further comprising the steps determining if the actual humidity of the inside space is above the humidity set point by at least a predetermined amount; and adjusting the cooling set point in a downward direction if the actual humidity of the inside space is determined to be above the humidity set point by at least the predetermined amount.

17. A method for adjusting the cooling set point of a climate control system for an inside space, the climate control system having a cooling set point and a humidity set point, the method comprising the steps of:

determining if the actual humidity of the inside space is above the humidity set point by at least a predetermined humidity offset amount; and adjusting the cooling set point in a downward direction if the actual humidity of the inside space is determined to be above the humidity set point by at least the predetermined humidity offset amount.

18. A method according to claim 17 further comprising the steps of:

determining if the actual humidity of the inside space is below the humidity set point by at least a predetermined amount; and adjusting the cooling set point in an upward direction if the actual humidity of the inside space is determined to be below the humidity set point by at least the predetermined amount.

19. A method for adjusting the cooling set point of a climate control system for an inside space, the climate control system having a cooling set point and a humidity set point, the method comprising the steps of:

sensing the humidity of the inside space;

determining a humidity error as a function of the sensed humidity, the humidity set point, and a predetermined humidity offset value;

determining a cooling offset as a function of the humidity error; and adjusting the cooling set point by the cooling offset.

20. A method according to claim 19 further comprises the step of limiting the cooling offset to a predetermined cooling offset range.

21. A method according to claim 20 wherein the predetermined cooling offset range is at least partially defined by a cooling offset maximum.

22. A method according to claim 20 wherein the predetermined cooling offset range is at least partially defined by a cooling offset minimum.

23. A method according to claim 20 wherein the predetermined cooling offset range is defined by a cooling offset maximum and a cooling offset minimum.

24. A climate control system for an inside space, the climate control system having a cooling set point and a humidity set point, wherein the cooling set point is set by a user of the climate control system, comprising:

means for determining if the actual humidity of the inside space is below the humidity set point by at least a predetermined amount; and means for adjusting the cooling set point in an upward direction if the determining means determines that the actual humidity of the inside space is below the humidity set point by at least the predetermined amount.

25. A climate control system for an inside space, the climate control system having a cooling set point and a humidity set point, comprising:

means for determining if the actual humidity of the inside space is above the humidity set point by a predetermined humidity offset amount; and means for adjusting the cooling set point in a downward direction if the determining means determines that the actual humidity of the inside space is above the humidity set point by the predetermined humidity offset amount.

26. A climate control system for an inside space, the climate control system having a cooling set point and a humidity set point, wherein the cooling set point is set by a user of the climate control system, comprising:

a controller for determining if the actual humidity of the inside space is above or below the humidity set point; and the controller adapted to adjust the cooling set point in an upward direction if the controller determines that the actual humidity of the inside space is below the humidity set point by at least a predetermined amount;

the controller further adapted to adjust the cooling set point in a downward direction if the controller determines that the actual humidity of the inside space is above the humidity set point by a predetermined amount.

* * * * *